United States Patent Office

2,915,362
Patented Dec. 1, 1959

2,915,362

PLUTONIUM-HYDROGEN REACTION PRODUCT, METHOD OF PREPARING SAME AND PLUTONIUM POWDER THEREFROM

Sherman Fried, Chicago, Ill., and Harlan L. Baumbach, Pacific Palisades, Calif., assignors to the United States of America as represented by the United States Atomic Energy Commission No Drawing. Application August 16, 1946
Serial No. 691,163

3 Claims. (Cl. 23—14.5)

This invention relates to new compositions of matter, namely hydrides of transuranic elements and more particularly to the hydrides of plutonium and the method of their preparation and to a simple method of combining the metal plutonium and hydrogen.

These aforementioned plutonium hydrides provide an inexpensive simple means for obtaining finely divided plutonium metal in a pure and highly reactive state by the formation and decomposition of the hydrides of plutonium.

The term "plutonium" is used in the present disclosure to designate the transuranic element of atomic number 94 and all of its isotopes in any proportion. This element has recently been prepared by various nuclear processes from the uranium isotope of mass number 238. The methods of preparation of plutonium are set forth in the following patent applications: Serial No. 637,484 by Glenn T. Seaborg, Arthur C. Wahl and Joseph W. Kennedy; Serial No. 637,485 by Glenn T. Seaborg; Serial No. 637,486 by Arthur C. Wahl and Joseph W. Kennedy; and Serial No. 637,487 by Arthur C. Wahl. The term "hydrogen" is used in this disclosure to designate the element hydrogen and all of its isotopes including those of mass numbers 1, 2, and 3.

The new compositions can be formed by the action of pure hydrogen gas upon plutonium metal. Various types of apparatus may be used, but in general the apparatus consists of the following: A reaction chamber of a material such as quartz or Pyrex glass, which will not decompose at temperatures of up to 500° C. and will not react with plutonium, hydrogen or plutonium hydride within this range of temperature; a means of heating the reaction chamber, such as an electric furnace; a source of pure hydrogen; and means of introducing it to the reaction chamber under controlled pressure.

The plutonium metal is placed in the reaction chamber and the air is evacuated therefrom. Hydrogen is then admitted to the chamber. If the metal is substantially free of impurities, the reaction will take place at room temperature and atmospheric pressure. There may, however, be a short incubation period required. Dependent upon the quantity of metal used and its physical state, it may be desirable to conduct the reaction at less than atmospheric pressure or less than room temperature in order to prevent that excessive heat is liberated by the reaction or the reaction proceeds with explosive violence. If the plutonium metal used is not substantially pure, it may be necessary to apply heat to the reaction chamber to cause the reaction to take place.

Plutonium metal, upon reacting with the hydrogen, disintegrates to form the hydride which is a fluffy, shiny, black, finely divided powder, having a more or less metallic appearance. During the reaction, particles of the hydride may be thrown off the metal with some violence. Considerable heat may be evolved during the reaction. The reaction may be reversed at temperatures above about 200° C. but the reaction shows increasing irreversibility below this temperature.

It appears that the reaction of the plutonium metal with the hydrogen proceeds in the following steps:

(1) $Pu + H_2 \rightarrow PuH_2$ the Pu and $PuH_2$ being separate phases.

(2) $PuH_2 + \frac{1}{2} H_2 \rightarrow PuH_3$ the $PuH_2$ and $PuH_3$ being in solid solution in one another.

The solid solution of $PuH_2$ and $PuH_3$ is satisfactory for most technical uses such as: (a) the obtaining of a finely divided, highly reactive form of pure plutonium metal by a decomposition of the solid solution of the hydrides; (b) the use of the hydrides as the fissionable component of a neutronic reactor.

The use of hydrogen of mass 2 (deuterium) or mass 3 (tritium) in place of hydrogen mass 1 yields a plutonium deuteride or a plutonium triteride, respectively. The chemical properties of these compounds are similar to those of the hydride. Comparison of plutonium deuteride with plutonium hydride of corresponding composition shows that the vapor pressure of the hydrogen gas above the deuteride is 1.45 to 1.50 times greater than the vapor pressure above the hydride.

This invention may be illustrated by the following specific examples:

*Example I*

A sample of plutonium metal weighing 82.9 milligrams was placed in a small Pyrex reaction chamber which was held in a furnace. The reaction chamber was connected to a vacuum line which contained a gas burette, a manometer and hydrogen supply. The whole system was evacuated and then hydrogen was admitted to the reaction chamber. The sample absorbed 15.1 cc. of hydrogen at 584.4 mm. pressure and 24° C. The absorption started at room temperature after an incubation period of three minutes; absorption was rapid and the reaction was complete six minutes after it started. The characteristic finely divided hydride was formed. Analysis showed the composition to be $PuH_{2.75}$.

*Example II*

A 51-milligram sample of plutonium was reacted with pure hydrogen at room temperature in an apparatus similar to that described in Example I above. The reaction occurred after an incubation period of approximately 10 minutes. Particles of the hydride were violently ejected from the button of plutonium metal during the 20 minute period of reaction. The formula for the hydride was found to be $PuH_{3.01}$. Heating the sample until it decomposed and then cooling in a pure hydrogen atmosphere until the hydride reformed, showed successive compositions for the sample of $PuH_{2.99}$ and $PuH_{2.91}$.

Plutonium hydride is a shiny black solid, usually pulverulent in form, and with a more or less metallic appearance. The ratio of hydrogen to plutonium varies from about $PuH_2$ to about $PuH_3$. The hydride decomposes on heating, for example, above about 200° C. to form hydrogen and a finely divided form of plutonium metal.

Plutonium hydride reacts with hydrides of non-metals such as, diborane, hydrogen fluoride, hydrogen chloride, ammonia, hydrogen bromide, hydrogen sulfide, methane, water and also reacts with air. Plutonium hydride fissions upon neutronic bombardment and may be used effectively as the fissionable component of a neutronic reactor.

Although the present invention has been described with particular reference to certain of the specific details of certain embodiments thereof, it is not intended that such details shall be regarded as limitation upon the scope of

What is claimed is:

1. A reaction product of plutonium and hydrogen having the empirical formula $PuH_x$ where $x$ is a number above about 2 and not substantially above 3.

2. A method of forming plutonium hydride from massive plutonium metal, comprising reacting hydrogen with said massive plutonium metal at about room temperature whereby the plutonium is converted to powdery plutonium hydride.

3. A method of producing powdered plutonium metal from massive metal comprising reacting massive plutonium metal with hydrogen gas at room temperature whereby the metal is converted to hydride powder and heating the plutonium hydride to above 200° C. whereby it is decomposed and plutonium powder is formed.

References Cited in the file of this patent

UNITED STATES PATENTS

| 1,835,024 | Driggs | Dec. 8, 1931 |
| 2,497,911 | Reilley et al. | Feb. 21, 1950 |

OTHER REFERENCES

AECD-2124, May 16, 1944, declassified July 19, 1948, 2 pages.

MDDC-717, Sept. 14, 1944, declassified February 26, 1947, 8 pages.